(12) United States Patent
Lechner et al.

(10) Patent No.: US 8,555,624 B2
(45) Date of Patent: Oct. 15, 2013

(54) CONNECTION DEVICE FOR MEDIA LINES

(75) Inventors: Martin Lechner, Lindlar (DE); Marco Isenburg, Ratingen (DE); Olaf Offermann, Wipperfurth (DE)

(73) Assignee: VOSS Automotive GmbH, Wipperfurth (DE)

( * ) Notice: Subject to any disclaimer, the term of this patent is extended or adjusted under 35 U.S.C. 154(b) by 508 days.

(21) Appl. No.: 12/679,203

(22) PCT Filed: Sep. 3, 2008

(86) PCT No.: PCT/EP2008/061597
§ 371 (c)(1),
(2), (4) Date: Oct. 28, 2010

(87) PCT Pub. No.: WO2009/040223
PCT Pub. Date: Apr. 2, 2009

(65) Prior Publication Data
US 2011/0036081 A1    Feb. 17, 2011

(30) Foreign Application Priority Data
Sep. 21, 2007    (DE) .................... 20 2007 013 316 U

(51) Int. Cl.
| F01N 3/10 | (2006.01) |
| F16L 35/00 | (2006.01) |
| F16L 55/00 | (2006.01) |
| F16L 33/16 | (2006.01) |
| F16L 37/00 | (2006.01) |
| F16L 37/06 | (2006.01) |
| F16L 37/16 | (2006.01) |
| F16L 37/18 | (2006.01) |
| F16L 39/00 | (2006.01) |

(52) U.S. Cl.
USPC ................. 60/303; 285/81; 285/83; 285/305; 285/306; 285/316; 285/318

(58) Field of Classification Search
USPC ............ 60/295, 301, 303, 322; 285/1, 81, 83, 285/305–306, 316–319, 323
See application file for complete search history.

(56) References Cited

U.S. PATENT DOCUMENTS

| 4,435,005 A | 3/1984 | Berger et al. |
| 5,711,550 A * | 1/1998 | Brandt ......................... 285/101 |

FOREIGN PATENT DOCUMENTS

| DE | 2749098 A1 | 5/1978 |
| DE | 2752374 A1 | 5/1979 |

(Continued)

OTHER PUBLICATIONS

PCT/EP2008/061597—International Search Report mailed on Mar. 31, 2009.

*Primary Examiner* — Kenneth Bomberg
*Assistant Examiner* — Audrey K Bradley
(74) *Attorney, Agent, or Firm* — Brinks Hofer Gilson & Lione

(57) ABSTRACT

The present invention relates to a connection device (1) for at least one media line (2), such as for a urea-water solution for exhaust gas after-treatment in a motor vehicle having an internal combustion engine. The connection device comprises a connection part (4) having a socket (6) for the circumferentially sealed insertion of a line-side plug section (8), and retention means (10) for locking the inserted plug section (8) in place to prevent detachment. The retention means (10) is configured in such a way that starting from a normal operating position the inserted and locked plug section (8) can be moved over a specific travel path relative to the connection part (4) in opposition to a return force (F), in order to enlarge an internal volume inside the connection part (4) to which the medium is admitted.

3 Claims, 2 Drawing Sheets

(56) References Cited

FOREIGN PATENT DOCUMENTS

| | | |
|---|---|---|
| DE | 199307361 U1 | 7/1993 |
| DE | 19510193 A1 | 9/1996 |
| DE | 29807763 U1 | 9/1999 |
| DE | 20017921 U1 | 2/2002 |
| DE | 20115436 U1 | 2/2003 |
| DE | 20214847 U1 | 2/2004 |
| DE | 10359522 A1 * | 7/2005 |
| DE | 202005013691 U1 | 1/2007 |
| EP | 1553270 A1 | 7/2005 |
| GB | 2009872 A * | 6/1979 |
| JP | 08152082 A | 6/1996 |
| JP | 10306889 A | 11/1998 |
| JP | 2000065266 | 3/2000 |
| JP | 2000266261 A | 9/2000 |
| JP | 2000266261 A * | 9/2000 |
| WO | WO2005001322 A | 1/2005 |

* cited by examiner

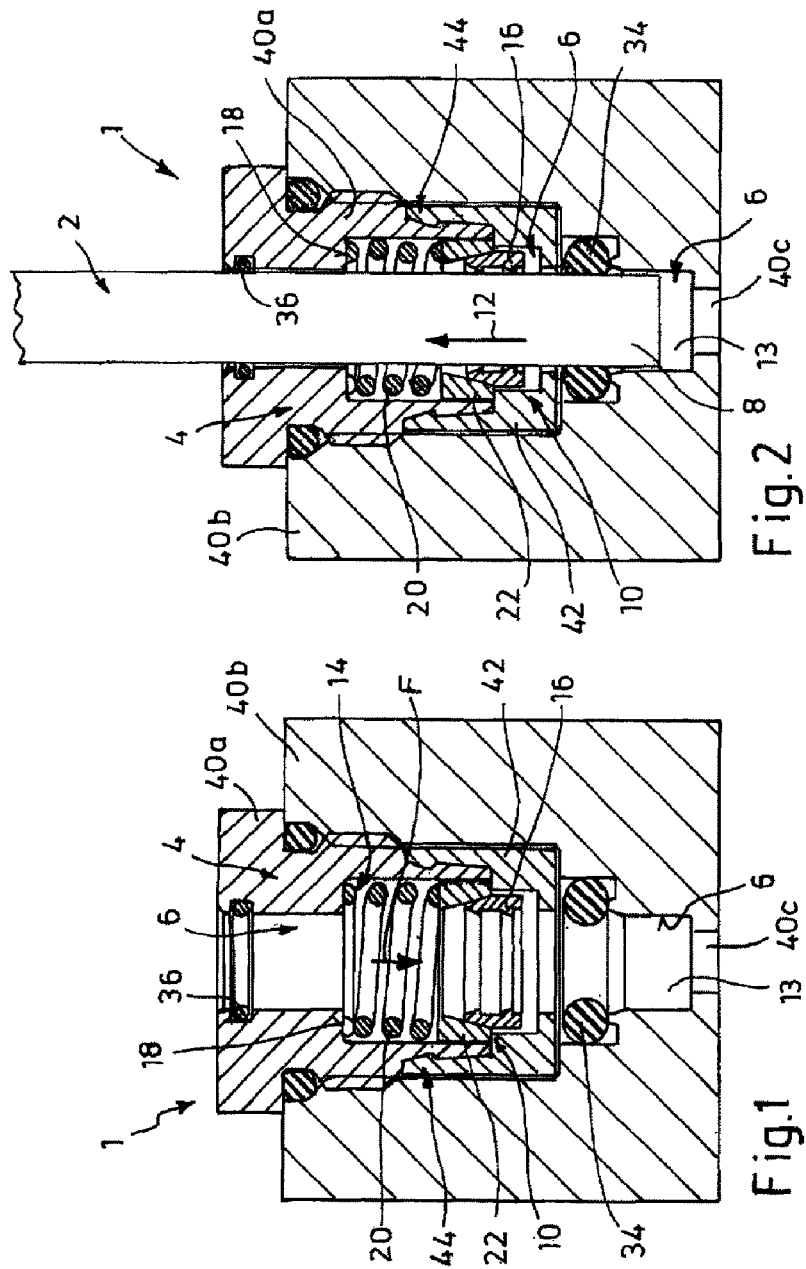

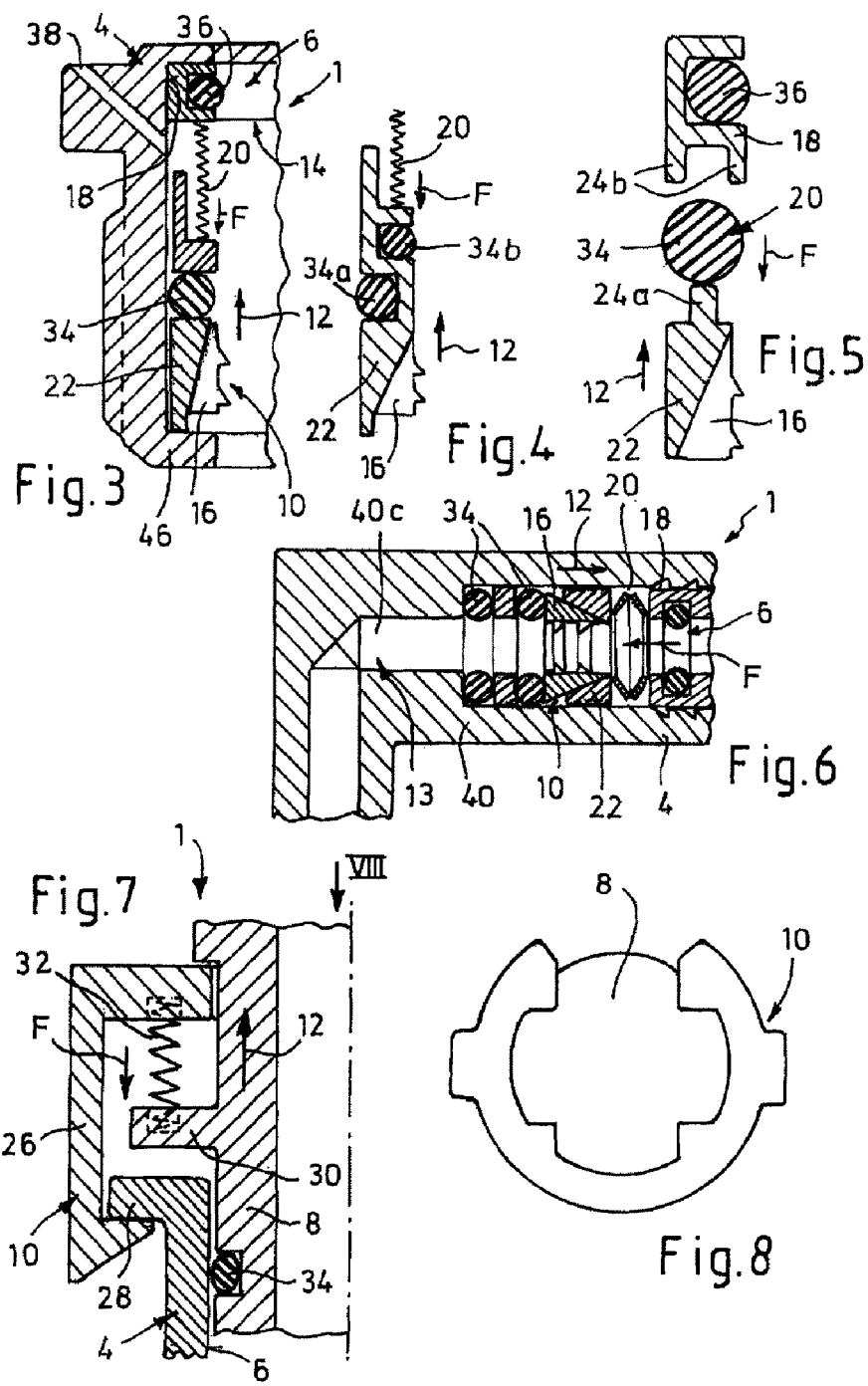

CONNECTION DEVICE FOR MEDIA LINES

CROSS REFERENCE TO THE RELATED APPLICATION

This application claims priority to PCT patent application PCT/EP2008/061597 filed Sep. 3, 2008 and DE patent application 20 2007 013 316.2 filed Sep. 21, 2007.

FIELD OF THE INVENTION

The present invention relates to a connection device for at least one media line, in particular for a urea-water solution for exhaust gas after-treatment in a motor vehicle having an internal combustion engine, comprising a connection part having a socket for the circumferentially sealed insertion of a line-side plug section, and retention means for locking the inserted plug section in place to prevent detachment.

BACKGROUND OF THE INVENTION

Such line connection devices for fluid lines are sufficiently disclosed in numerous publications. Reference will here be made, merely by way of example, to the publications DE 20 2005 013 691 U1, DE 195 10 193 A1, DE 202 14 847 U1, DE 93 07 361 U1 and to DE 298 07 763 U1, DE 200 17 921 U1 and DE 201 15 436 U1.

In motor vehicle engineering so-called selective catalytic reduction (SCR) catalytic converters are sometimes used. In particular, in the case of diesel engines, an aqueous urea solution (e.g. 32.5% urea) may be used as NOx reduction additive. A known problem here is that owing to its relatively high freezing point (approximately −11° C.), a urea-water solution has a tendency to freeze at such ambient temperatures which, depending on the climate and geographical location, are not at all uncommon. The same also applies to water lines for the windshield washer system, unless an adequate antifreeze additive is used. It is commonly known that in the phase change (change in the physical state from liquid to solid), which occurs when liquids freeze, a volume expansion also generally occurs. In practice, therefore, damage and leaks frequently occur in the area of such piping due to the liquid freezing.

If line connection devices of the type described above are now used in such SCR systems, damage due to detachment of the line may occur in continuous service over many cycles of the liquid freezing.

EP 1 553 270 A1 also addresses the problem that difficulties have to be overcome particularly in the case of SCR systems, because the increase in volume that occurs on freezing can lead to damage to components of the SCR unit. In the case of the exhaust gas after-treatment unit described in this publication, at least one reservoir in the form of an expansion chamber, which is intended, in particular through deformation of an elastic expansion part, to accommodate the expanded volume once the medium reaches a freezing pressure, is provided inside the line system. The elastically deformable expansion part may take the form of a diaphragm, which is intended to ensure sufficient elasticity even when subjected to repeated freezing and thawing of the liquid. Since the expansion chamber inside the system is in each case only located at a specific point, however, freezing with the associated consequences can still occur in the rest of the line area and particularly, also in the area of line connection devices.

According, further improvements may be desirable for a connection device of the aforementioned type, which provides a structurally simple and cost-effective design and improved operating characteristics that is especially suited to use in SCR systems and which at the same time avoids damage due to freezing in the connection area of the respective line.

SUMMARY OF THE INVENTION

In at least one embodiment of the present invention, a retention means of the connection device is provided. The retention means is configured in such a way that starting from a normal operating position, a inserted and locked plug section can be moved over a specific travel path relative to the connection part in opposition to a return force in order to enlarge an internal volume which is situated inside the connection part and outside the plug section, that is between the latter and the socket, and to which the respective medium is admitted. According to the present invention, therefore, an expansion chamber is virtually incorporated into the connection device.

Even in the event of an increase in the volume of the medium due to freezing, relative forces in the area of the retention means are thereby advantageously avoided in that the line, in each case together with components of the retention means (thereby maintaining the locking facility) is displaceable in the detachment direction in opposition to the return force. According to the present invention, the return force may be calculated in such a way that, in an unpressurized state or at a predefined operating pressure of the medium, the media line or the plug section is held in the normal operating position, and in opposition to the return force is displaced in the detachment direction only in the event of an increased pressure occurring due to a phase change when the medium freezes.

The present invention may be adapted to be suitable for any type of connection device and retention means. It may in principle be a connection device such as that described in the aforementioned publication DE 20 2005 013 691 U1 or in another of aforementioned documents. The retention means may take the form of a radially elastic locking ring which is supported inside the connection part, and which by way of a tapered outer face interacts with an internal taper of the connection part, so that it is drawn into the internal taper by a movement in the line detachment direction, thereby clamping the line radially. The present invention is in no way limited to such a design, and may be used for other designs.

BRIEF DESCRIPTION OF THE DRAWINGS

The present invention will now be explained in more detail with reference to some exemplary embodiments illustrated in the drawing, in which:

FIG. 1 is an axial sectional view through a first, preferred embodiment of a connection device according to the present invention;

FIG. 2 is a view as depicted in FIG. 1, but with a media line inserted in accordance with at least one embodiment of the operating principle of the present invention;

FIG. 3 is a partial axial sectional view through a further embodiment of the connection device according to the present invention;

FIG. 4 is a separate representation of the components depicted in FIG. 3 in a design variant;

FIG. 5 is a further design variant with respect to FIGS. 3 and 4;

FIG. 6 is an axial sectional view of another embodiment of a connection device according to the present invention;

FIG. 7 is a partial sectional view through an embodiment of a connection device according to the present invention with a different retention means; and FIG. 8 is a schematic plan view of the embodiment depicted in FIG. 7 in the direction of the arrow VIII, In the above apparatus for recording the rotation angle of a vehicle, the buffer may be a ring buffer capable of storing the differential rotation angles, each of which occurs in unit of time, across the recording time. This is effective as means for recording a latest part of the vast data.

DETAILED DESCRIPTION

In the various figures, the same parts are identified using the same reference numerals.

Referring to FIGS. 1 and 2, a connection device 1 according to at least one embodiment of the present invention serves for the rapid and in particular detachable connection of at least one media line 2. In a preferred embodiment, the media line 2 is used for a urea-water solution, as is used for the exhaust gas after-treatment in diesel engines. The connection device 1 comprises a connection part 4 having a socket 6 for the circumferentially sealed insertion of a line-side plug section 8, and retention means 10 for locking the inserted plug section 8 in place to prevent detachment. The plug section 8 may be embodied as a line end integral with the media line 2 (as in FIG. 2) or as a separate plug part (as in FIG. 7) to be connected to the line.

According to the embodiment of the present invention, the retention means 10 is configured in such a way that starting from a normal operating position (shown in FIG. 2) the inserted and locked plug section 8 can be moved in the detachment direction (arrow 12) over a specific axial travel path relative to the connection part 4 in opposition to a return force F, in order to enlarge an internal volume which is situated inside the connection part 4. This displacement and the resulting enlargement of the internal volume, to which the medium is admitted, in the transitional area between the line 2 or its plug section 8 and the socket 6, forms an integral expansion chamber 13 inside the connection part 4 (see FIG. 2). A volume enlargement occurring when the respective medium freezes can thereby be accommodated so that a sharp increase in pressure or pressure rise from the very high freezing pressure does not occur in the event of a freezing phase change of the medium. Instead, because of the larger volume due to the expansion chamber 13, the pressure rise follows a much lower characteristic pressure curve.

The return force F is calculated so that in an unpressurized state or at a predefined operating pressure of the respective medium, the media line 2 or the plug section 8 is kept in the normal operating position and is displaced in the detachment direction 12 in opposition to the return force F only in the event of an increased pressure occurring due to a phase change when the medium freezes. In the preferred embodiment, the usual operating pressure is in the range from 3 to 11 bar and is, more preferably, 4 to 6 bar. Owing to a certain bias of the return force F, the displacement of the locked plug section 8 of the line 2 together with the components of the retention means 10 in opposition to the return force F occurs only when the freezing pressure rises beyond this pressure range. The return force F should in this context remain largely constant over the working or moving range. This means that with as flat a spring characteristic as possible, no more than a slight variation in the force should occur.

The movement of the media line 2 in the detachment direction 12 is limited by a travel limit stop 14 where the travel limit stop 14 is reached, for example, from an increased pressure of about 20 to 50 bar.

In the embodiments illustrated in FIGS. 1 to 6, a retention means 10 in the form of a retention element 16 is supported so that it is moveable in an axial direction inside the connection part 4 and acting non-positively and/or through positive interlock against the plug section 8, is provided as a preferred exemplary embodiment. In this case, at least one spring element 20 generating the return force F is arranged between the retention element 16 and an abutment 18 inside the connection part 4. In the preferred exemplary embodiments shown, the retention element 16 is embodied as a locking ring, which at a point on the circumference has a slit passing through it, making it radially elastic, and which interacts by way of an external taper with an internal taper inside the connection part 4, so that it is radially constricted and in particular acts with at least one internal tooth edge against the plug section 8. The internal taper here is an integral part of an annular insert 22. This insert 22 is displaceably guided inside the connection part 4 in opposition to the return force F. The spring element 20 may here be embodied, as in FIGS. 1 and 2, as a helical compression spring or as in FIG. 5 as a so-called rubber spring in the form of an elastic ring or as in FIG. 6 as a disk spring. In the embodiment illustrated in FIG. 5, the elastic ring may at the same time form a peripheral sealing ring. In this case, its deformation behavior determining the return force F may be influenced by projections 24a, 24b of the insert 22 and the abutment 18 acting in opposition to the spring element 20.

In the alternative embodiment illustrated in FIGS. 7 and 8, at least one external retention element 26, approximately C-shaped in longitudinal section, which radially and with axial clearance overlaps two outer, radial flange elements 28 and 30 on one side of the connection part 4 and on the other side of the plug section 8, is provided as retention means 10. At least one spring element 32 generating the return force F is arranged between the flange element 30 of the plug section 8 and the retention element 26.

In one or more of the embodiments, at least one seal 34 is provided for circumferentially sealing off the inserted plug section 8 in relation to the socket 6. The embodiment according to FIG. 6 is designed with two axially spaced seals 34 separated by a backing ring. In the embodiments according to FIGS. 1 and 2 as well as FIG. 6, each seal 34 is immovably supported inside the connection part 4.

In the embodiments illustrated in FIGS. 3 and 4, the seal 34 is guided so that it is axially displaceable together with the media line 2 and components of the retention means 10. According to FIG. 4, the seal 34 may be divided into a seal member 34a acting radially outwards and a seal member 34b acting radially inwards. In these embodiments, a chamber formed inside the connection part 4 between the seal 34 or 34a, 34b and a dirt seal 36 that is additionally arranged in the orifice area of the socket 6, is preferably connected to the outside atmosphere via at least one venting duct 38. This serves to avoid the possibility of a volume of air, which is included between the seal 34 and the dirt seal 36 and enclosing the line 2, being compressed in the event of the displacement in the direction of the arrow 12.

In the embodiment according to FIG. 7, the seal 34 is supported in an annular groove on the plug section 8.

In an appropriate development, the connection part 4 may comprise a so-called cap screw 40a and basically any housing part 40b. Represented in FIGS. 1 and 2, the cap screw 40a is screwed by an external thread into a tapped hole of the housing part 40b. Here, the functional components of the retention means 10 are held inside the socket 6 by an additional stopper part 42, which is preferably connected to the cap screw by detent means 44. The seal 34 is immovably arranged axially between an inner end face of the cap screw 40a and a radial step of the housing part 40b. This serves to keep the area of the retention means 10 free of the media flowing through the line 2 and a duct 40c of the housing part 40b.

Alternatively and as illustrated in FIG. 3, the cap screw has an end flange 46 for retaining the functional components. The seal 34 is furthermore arranged axially between the retention means 10 and the spring element 20 generating the return force F. The retention means 10 is therefore situated in an area exposed to the medium and should therefore be composed of a material insensitive to the medium.

According to FIG. 6, the connection part 4 may be embodied directly as a housing part 40.

O-rings, lip seals, quad rings or the like, may be used as seals 34, 36.

As a person skilled in the art will appreciate, the above description is meant as an illustration of implementation of the principles of this invention. This description is not intended to limit the scope or application of this invention in that the invention is susceptible to modification, variation and change, without departing from the spirit of this invention, as defined in the claims.

The invention claimed is:

1. A connection device for at least one media line that fluidly communicates a medium, the connection device comprising:
a connector having portions defining a socket, a line-side plug configured to be coupled to the media line, the line-side plug located within the socket and circumferentially sealed with respect to the socket by a seal located therein, a retainer locking the line-side plug within the connector, the line side plug being moveable from a normal operating position to a displaced operating position, in the displaced operating position an end of the line-side plug being spaced from a portion of the socket so as to define an enlarged internal volume inside of the connector and to which a medium in the media line is fluidly communicated, the line-side plug being biased by a spring into the normal operating position and being moveable in opposition to a return force (F) exerted by the spring toward the normal operating position, further comprising at least one external retention element, the retention element being C-shaped in longitudinal section and radially and axially overlapping a radial outer flange on the connector and a radial outer flange on the line-side plug, and the spring being axially positioned between the flange of the line-side plug and the retention element.

2. A connection device for at least one media line that fluidly communicates a medium, the connection device comprising: a connection part having portions defining a socket, a line-side plug received within the socket and being circumferentially sealed therein, and a retention assembly locking the line-side plug in place whereby detachment of the line-side plug from the connection part is prevented, the retention assembly being located within the socket and including a clamping ring having a slit defined therein whereby the clamping ring is radially elastic, the clamping ring further including an outer conical surface and at least one inner toothed edge with non-positive and/or positive radial engagement with the line-side plug, the retention assembly further including an annular insert positioned with the socket and being axially moveable therein, the annular insert including an inner conical surface engaging the outer conical surface of the clamping ring, whereby the retention assembly is configured such that starting from a normal operating position the line-side plug can be moved over a specific travel path relative to the connection part in opposition to a return force (F) so as to enlarge an internal volume inside the connection part to which the medium is fluidly communicated, at least one seal provided for circumferentially sealing off the line-side plug and the seal being arranged inside the connection part in an area between the retention assembly and a spring element generating the return force (F).

3. A connection device for at least one media line that fluidly communicates a medium, the connection device comprising: a connection part having portions defining a socket, a line-side plug received within the socket and being circumferentially sealed therein, and a retention assembly locking the line-side plug in place whereby detachment of the line-side plug from the connection part is prevented, the retention assembly being located within the socket and including a clamping ring having a slit defined therein whereby the clamping ring is radially elastic, the clamping ring further including an outer conical surface and at least one inner toothed edge with non-positive and/or positive radial engagement with the line-side plug, the retention assembly further including an annular insert positioned with the socket and being axially moveable therein, the annular insert including an inner conical surface engaging the outer conical surface of the clamping ring, whereby the retention assembly is configured such that starting from a normal operating position the line-side plug can be moved over a specific travel path relative to the connection part in opposition to a return force (F) so as to enlarge an internal volume inside the connection part to which the medium is fluidly communicated, at least one seal provided for circumferentially sealing off the line-side plug, a chamber formed inside the connection part being located between the seal and a dirt seal that is additionally arranged in an entrance orifice area of the socket, and the chamber being connected to the outside atmosphere via at least one venting duct.

* * * * *